(12) United States Patent
Francis et al.

(10) Patent No.: US 10,598,004 B2
(45) Date of Patent: Mar. 24, 2020

(54) DATA COMMUNICATION SYSTEM WITH MULTIPLE DATA LINKS AND OPERATING MODES

(71) Applicant: BAE SYSTEMS plc, London (GB)

(72) Inventors: Gary Kevin Francis, Chelmsford Essex (GB); Andrew Robert Mackey, Chelmsford Essex (GB); Matthew Robert Gore, Chelmsford Essex (GB)

(73) Assignee: BAE SYSTEMS plc, London (GB)

( * ) Notice: Subject to any disclaimer, the term of this patent is extended or adjusted under 35 U.S.C. 154(b) by 277 days.

(21) Appl. No.: 15/523,173

(22) PCT Filed: Oct. 26, 2015

(86) PCT No.: PCT/GB2015/053204
§ 371 (c)(1),
(2) Date: Apr. 28, 2017

(87) PCT Pub. No.: WO2016/067005
PCT Pub. Date: May 6, 2016

(65) Prior Publication Data
US 2017/0321541 A1    Nov. 9, 2017

(30) Foreign Application Priority Data
Oct. 31, 2014    (GB) .................................. 1419423.7

(51) Int. Cl.
*H04L 12/24*     (2006.01)
*E21B 47/12*     (2012.01)
(Continued)

(52) U.S. Cl.
CPC .............. *E21B 47/12* (2013.01); *H04B 11/00* (2013.01); *H04B 13/02* (2013.01); *H04L 29/06* (2013.01);
(Continued)

(58) Field of Classification Search
CPC ....... E21B 47/12; E21B 47/122; H04B 11/00; H04B 13/02; H04L 29/08; H04L 29/06; H04L 67/12; H04L 25/00; H04L 67/28
(Continued)

(56) References Cited

U.S. PATENT DOCUMENTS 4,532,812 A    8/1985  Birchak
4,562,559 A    12/1985 Sharp et al.
(Continued)

FOREIGN PATENT DOCUMENTS

EP    0261825 A2    3/1988
EP    0837217 A2    4/1998
(Continued)

OTHER PUBLICATIONS

International Search Report and Written Opinion received for Patent Application No. PCT/GB2015/053204, dated Feb. 12, 2016. 11 pages.
(Continued)

*Primary Examiner* — Ario Etienne
*Assistant Examiner* — Elizabeth Kassa
(74) *Attorney, Agent, or Firm* — Finch & Maloney PLLC

(57) ABSTRACT

A communication system is configurable to operate in either a transparent mode or a data streaming mode. In the transparent mode data is transferred to a data requesting component from a data source using a request-response protocol. In the data streaming mode a second data transfer component is configured to obtain data from the data source component via a third data link, and to transfer the data to a first data transfer component via a second data link, which has a relatively higher latency, without using the request-response protocol. The first data transfer component is configured to store the transferred data and to transfer the stored data to the data requesting component via the first data link upon
(Continued)

receiving a request for the stored data from the data requesting component.

15 Claims, 6 Drawing Sheets

(51) Int. Cl.
*H04B 13/02* (2006.01)
*H04B 11/00* (2006.01)
*H04L 29/08* (2006.01)
*H04L 29/06* (2006.01)
*H04L 25/00* (2006.01)

(52) U.S. Cl.
CPC .............. *H04L 29/08* (2013.01); *H04L 67/12* (2013.01); *H04L 25/00* (2013.01)

(58) Field of Classification Search
USPC ........................................................ 709/234
See application file for complete search history.

(56) References Cited

U.S. PATENT DOCUMENTS

| | | | |
|---|---|---|---|
| 4,675,852 A | 6/1987 | Russell et al. | |
| 5,081,406 A | 1/1992 | Hughes et al. | |
| 5,303,207 A * | 4/1994 | Brady | H04B 13/02 367/134 |
| 5,592,438 A | 1/1997 | Rorden et al. | |
| 6,648,082 B2 | 11/2003 | Schultz et al. | |
| 6,772,214 B1 * | 8/2004 | McClain | G06F 16/9574 709/229 |
| 6,837,332 B1 | 1/2005 | Rodney | |
| 7,411,864 B2 | 8/2008 | Hurst et al. | |
| 8,305,227 B2 * | 11/2012 | Jaffrey | H04B 13/02 340/850 |
| 9,657,563 B2 | 5/2017 | Schuhrke et al. | |
| 2002/0050930 A1 | 5/2002 | Thomeer et al. | |
| 2002/0133537 A1 * | 9/2002 | Lau | H04L 67/1008 709/203 |
| 2003/0151977 A1 | 8/2003 | Shah et al. | |
| 2005/0035874 A1 | 2/2005 | Hall et al. | |
| 2006/0221768 A1 | 10/2006 | Hall et al. | |
| 2007/0000667 A1 | 1/2007 | MacKenzie et al. | |
| 2008/0247273 A1 | 10/2008 | Chemali et al. | |
| 2009/0208219 A1 * | 8/2009 | Rhodes | H04B 13/02 398/104 |
| 2009/0240705 A1 | 9/2009 | Miloushev et al. | |
| 2010/0117855 A1 | 5/2010 | Sinclair et al. | |
| 2010/0149914 A1 | 6/2010 | Achanta | |
| 2010/0171637 A1 * | 7/2010 | Jaffrey | H04B 13/02 340/850 |
| 2011/0018735 A1 | 1/2011 | Garcia-Osuna et al. | |
| 2011/0176387 A1 | 7/2011 | Froelich | |
| 2012/0170410 A1 | 7/2012 | Hay | |
| 2012/0221697 A1 * | 8/2012 | Sainio | H04L 67/2847 709/223 |
| 2014/0025321 A1 * | 1/2014 | Spanier | G01R 21/133 702/62 |
| 2014/0153368 A1 * | 6/2014 | Bar-Cohen | E21B 47/14 367/81 |
| 2014/0269210 A1 * | 9/2014 | Bagshaw | H04B 11/00 367/140 |
| 2014/0341584 A1 * | 11/2014 | Hopewell | H04B 10/80 398/104 |
| 2015/0049794 A1 * | 2/2015 | Nakanishi | H04B 3/04 375/222 |
| 2015/0226054 A1 * | 8/2015 | Schuhrke | E21B 47/09 166/335 |
| 2015/0285065 A1 | 10/2015 | Howell et al. | |
| 2017/0317810 A1 | 11/2017 | Gore | |
| 2017/0317811 A1 | 11/2017 | Finch et al. | |

FOREIGN PATENT DOCUMENTS

| | | | | |
|---|---|---|---|---|
| EP | 2204530 | A1 | 7/2010 | |
| EP | 2 763 335 | A1 * | 8/2014 | ............ H04B 11/00 |
| EP | 2763335 | A1 | 8/2014 | |
| GB | 2481699 | A | 1/2012 | |
| WO | 0033108 | | 6/2000 | |
| WO | 2013057481 | A1 | 4/2013 | |
| WO | 2013185064 | A1 | 12/2013 | |
| WO | 2014011823 | A1 | 1/2014 | |
| WO | 2014018010 | A1 | 1/2014 | |
| WO | 2016067003 | A1 | 5/2016 | |
| WO | 2016067004 | A1 | 5/2016 | |
| WO | 2016067005 | A1 | 5/2016 | |

OTHER PUBLICATIONS

Warthman, Forrest, " Delay-and Disruption-Tolerant Networks: A Tutorial," Jul. 23, 2012. Retrieved from the Internet URL: http://ipnsig.org/wp-content/uploads/2012/07/DTN_Tutorial_v2.05.pdf. 36 pages.

Dunn, Shaun, "Subsea Communications for Solving Real World Problems," Mar. 13, 2014. Retrieved from the Internet URL: http://www.oceanologyinternational.com/_novadocuments/49394?v=6. 38 pages.

Heidemann, et al., "Research Challenges and Applications for Underwater Sensor Networking," Wireless Communications and Networking Conference, 2006. Retrieved from the Internet URL: https://www.isi.edu/~johnh/PAPERS/Heidemann06a.pdf. 8 pages.

Patel, Komal, "Underwater Sensor Networking," IJIRST—International Journal for Innovative Research in Science & Technology, vol. 1, Issue 1, Jun. 2014. pp. 18-21.

International Search Report and Written Opinion received for Patent Application No. PCT/GB2015/053203, dated Apr. 5, 2016. 13 pages.

GB Intellectual Property Office Search Report under Section 17(5) received for GB Patent Application No. 1419421.1 dated Apr. 7, 2015. 3 pages.

International Preliminary Report on Patentability received for Patent Application No. PCT/GB2015/053203, dated May 11, 2017. 10 pages.

International Preliminary Report on Patentability received for Patent Application No. PCT/GB2015/053202, dated May 11, 2017. 8 pages.

International Search Report and Written Opinion received for Patent Application No. PCT/GB2015/053202, dated Jan. 26, 2016. 12 pages.

GB Intellectual Property Office Search Report under Section 17(5) received for GB Patent Application No. 1419420.3 dated Apr. 7, 2015. 3 pages.

International Preliminary Report on Patentability received for Patent Application No. PCT/GB2015/053204, dated May 11, 2017. 8 pages.

GB Intellectual Property Office Search Report under Section 17(5) received for GB Patent Application No. 1419423.7 dated Mar. 10, 2015. 3 pages.

* cited by examiner

DATA COMMUNICATION SYSTEM WITH MULTIPLE DATA LINKS AND OPERATING MODES

The present invention relates to communication systems and methods.

Communication systems can use several different types of data links. The characteristics of the data links can vary. For instance, an acoustic data link in the system may have a higher latency compared to other links, such as wired links.

A commonly used method of transferring data in communication systems is request-response, where one component sends a request for data to another component in the system, which transfers data back in response to the request. A series of such data transfers may be required in order to send a full response.

A high latency link within a multi-hop system can cause the "rippling" of requests through the system, which can introduce considerable delays, particularly when it is desired to transfer data at a high rate.

Embodiments of the present invention are intended to address at least some of the above problems.

According to one aspect of the present invention there is provided a communication system comprising:
a data requesting component;
a first data transfer component;
a first data link between the data requesting component and the first data transfer component;
a second data transfer component;
a second data link between the first data transfer component and the second data transfer component;
a data source component;
a third data link between the data source component and the second data transfer component,
wherein the second data link has a relatively higher latency than at least one of the first data link and the third data link, and
wherein the communication system is configurable to operate in either:
a transparent mode, in which data is transferred to the data requesting component from the data source component via the third data link, the second data transfer component, the second data link, the first data transfer component and the first data link using a request-response protocol, and
a data streaming mode, in which:
the second data transfer component is configured to obtain data from the data source component via the third data link and to transfer the data to the first data transfer component via the second data link without using the request-response protocol, and
the first data transfer component is configured to store the transferred data and to transfer the stored data to the data requesting component via the first data link upon receiving a request for the stored data from the data requesting component.

Herein, "stored by the first data component" does not necessarily mean that the data store is located in/a part of the first data component; it could be a separate data store that is accessible by the first data transfer component. Further, at least one of the "data links" may comprise more than one physical data link, e.g. multiple cables connected together, which may or may not be all of the same type. There may also be at least one component/node between the ends of a data link.

The system (in some cases in the first data transfer component) may be configured to:
intercept requests from the data requesting component for data from the data source component, and
if the data requested by the data requesting component is stored by the first data transfer component then the stored data is transferred to the data requesting component via the first data link, or
if the data requested by the data requesting component is not stored by the first data transfer component then the system processes the request in the transparent mode.

The requests may be intercepted by recognising an address of the data source component in the request.

The data requesting component may operate as a master and the first data transfer component operates as a slave to the data requesting component in the data steaming mode.

The second data transfer component may operate as a master and the data source component operates as a slave to the second data transfer component in the data steaming mode.

The second data transfer component may operate as a data pump in the data streaming mode and may continuously (or frequently) obtain data from the data source component in the data streaming mode and/or may continuously (or frequently) transfer the obtained data to the first data transfer component over the second data link.

The transferred data may include an indicator designating whether the data is for transfer using the transparent mode or the data streaming mode.

The request-response protocol may comprise a MODBUS protocol. The first data link and/or the third data link may comprise an RS485 link.

The second data link may comprise an acoustic link.

The first and/or the second data transfer component may comprise a first set of transducers and a second set of transducers for implementing the acoustic link. The first and/or the second data transfer component may be configured to produce a signal for transmission by at least some of the transducers in the first set to at least some of the transducers in the second set. The first and/or the second data transfer component may be configured to process signals received from at least some of the transducers in the second set in order to select a best said signal that is used for further processing.

According to another aspect of the present invention there is provided a method of operating a communication system, the method comprising:
providing a data requesting component;
providing a first data transfer component;
providing a first data link between the data requesting component and the first data transfer component;
providing a second data transfer component;
providing a second data link between the first data transfer component and the second data transfer component;
providing a data source component;
providing a third data link between the data source component and the second data transfer component,
wherein the second data link has a relatively higher latency than at least one of the first data link and the third data link, and
operating the communication system in either:
a transparent mode, in which data is transferred to the data requesting component from the data source component via the third data link, the second data transfer component, the second data link, the first data transfer component and the first data link using a request-response protocol, or
a data streaming mode, in which:

the second data transfer component obtains data from the data source component via the third data link and transfers the data to the first data transfer component via the second data link without using the request-response protocol, and the first data transfer component stores the transferred data and transfers the stored data to the data requesting component via the first data link upon receiving a request for the stored data from the data requesting component.

According to another aspect of the present invention there is provided a communication system data transfer component comprising:

a first communication interface with a data link having a relatively higher latency than at least one other data link in the communication system;

a second communication interface with at least one other data link in the communication system;

a processor configured to operate in either:

a transparent mode in which data is transferred via the first and the second communication interfaces using a request-response protocol, or a data streaming mode in which the data transfer component:

obtains data from another communication system component via the second communication interface without using a request-response protocol; and transfers the obtained data to a further communication system component via the first communication interface without using a request-response protocol.

According to another aspect of the present invention there is provided a communication system data transfer component comprising:

a first communication interface with a data link having a relatively higher latency than at least one other data link in the communication system;

a second communication interface with at least one other data link in the communication system;

a processor configured to operate in either:

a transparent mode in which data is transferred via the first and the second communication interfaces using a request-response protocol, or a data streaming mode in which the data transfer component:

temporarily stores data received via the first communication interface; and transfers the stored data via the second communication interface to a data requesting component upon receiving a request for the stored data from the data requesting component.

According to yet another aspect of the present invention there is provided a communication network comprising at least one component and/or data link substantially as described herein.

According to yet another aspect of the present invention there is provided a communication system comprising:

a plurality of nodes;

a plurality of data links connected to the nodes;

wherein at least one of the data links has a relatively higher latency than others of the plurality of data links, and the communication system is configurable to transfer data between said nodes connected to the data link having the relatively higher latency using an alternative to a standard protocol.

A standard protocol used by the communication system may comprise a request-response protocol. At least some components of the communication system may be configurable to operate a transparent mode, in which data is transferred between the nodes via the data links using the request-response protocol.

The first one of the nodes connected to the data link having the relatively higher latency may be configured to obtain data from another node and transfer the obtained data over the data link having the relatively higher latency to a second one of the nodes. The second one of the nodes may be configured to temporarily store the obtained data and transfer the obtained data to another said node upon request.

According to another aspect of the present invention there is provided a method of operating a communication system, the method comprising:

continuously/frequently requesting data from a data source component;

continuously/frequently transferring the requested data to a data transfer component;

transferring the data over a data link to another data transfer component;

storing the data in a cache related to the other data transfer component, and transferring the data in the cache to a data requesting component upon request.

The first set may comprise a first subset comprising at least one said transducer, and a second subset comprising at least one said transducer, wherein the at least one transducer in the first subset has a first characteristic (e.g. frequency), and the at least one transducer in the second subset has a second characteristic (e.g. frequency).

A said transducer in the first subset may transmit on a first channel having an associated first frequency, and a said transducer in the second subset may transmit on a second channel having a second, different associated frequency.

The first signal processing device may be configured to produce the signal so that the signal is transmitted on the first channel by the first subset of transducers in the first set, and transmitted on the second channel by the second subset of transducers in the first set.

The first subset and the second subset of said transducers in the first set may be arranged in an interleaved manner, e.g. spaced apart in a line on/along a first member. A said transducer in the first subset may be spaced apart from an adjacent said transducer in the second subset by a regular distance.

The transducers in the second set may be configured to receive the signals transmitted on the first channel and the second channel.

The second signal processing device may select a best channel based on an error correction metric for data frames comprising the signals. The error correction metric may comprise a Viterbi bit error correction metric.

The transducers in the second set may include a first subset of the transducers and a second subset of the transducers.

The transducers in the first subset of the second set may be arranged in a first radial arrangement, e.g. a full or partial ring/loop around a second member. The transducers in the second subset of the second set may be arranged in a second radial arrangement around the second member, the first and the second radial arrangement being spaced apart axially.

The transducers in first subset of the second set may be configured to transmit the signal on the first channel to the first set of transducers. The transducers in the second subset of the second set may be configured to transmit the signal on the second channel to the first set of transducers.

In some embodiments, a transceiver unit (for the second set) may comprise a first pair of transducers of the first subset and a second pair of transducers of the second subset. One said transducer in the first pair may be configured to transmit and another said transducer in the first pair may be configured to receive. One said transducer in the second pair may be configured to transmit and another said transducer in the second pair may be configured to receive.

The transducers in the first set may be configured to receive the signals transmitted by the transducers in the second set on the first channel and the second channel.

The first signal processing device may be configured to process the signals received by the transducers in the first set on the first channel and the second channel in order to select a best channel from amongst the first and the second channels that is used to produce a first signal processing device output.

The first channel and the second channel may be centred on a predetermined intermediate frequency.

The first signal processing device and the second signal processing device may implement a COFDM modulation scheme for transmitting/receiving the signals.

The first (and/or the second) signal processing device may include a set of common transmitter components that can be used to partially produce the signal that is transmitted on the first channel by the first subset of transducers in the first set, and also to partially produce the signal that is transmitted on the second channel by the second subset of transducers in the first set. The common transmitter components may include a frame processor, an RS encoder, a codeword interleaver, a randomiser, a convolutional encoder and/or an OFDM modulator.

The first (and/or the second) signal processing device may include a set of common receiver components that can be used to partially process the signal that is received on the first channel (by the first/second subset of transducers in the first/second set), and also to partially process the signal that is received on the second channel (by the first/second subset of transducers in the first/second set). The common receiver components may include a codeword de-interleaver, an RS decoder and/or a frame processor.

A said transducer in the first set may convert the signal received from the first signal processing device so that the signal is transmitted acoustically. The transducers in the second set may convert the signal transmitted acoustically by a said transducer in the first set into an electrical signal for the second signal processing device.

The first signal processing device may receive an input signal and process the input signal to produce the signal. The input signal may be received from at least one sensor. The sensor may measure temperature or fluid flow characteristics.

An output of a said signal processing device may be used to control another device, e.g. a motor.

In use, the first set of transducers may be connected to a first member. In use, the second set of transducers may be connected to a second member. In use, at least one of the first and the second members may be moveable relative to one another. The first member may comprise (or be connected to) a mandrel. The second member may comprise (or be connected to) a conduit or riser in which the mandrel may be at least partially located in use. A medium, e.g. fluid, such as water, may, in use, be present or flow, between the first member and the second member (of the first and second sets of transducers).

According to another aspect of the present invention there is provided signal transmitting apparatus comprising:

a signal processing device configured to produce a signal for transmission by at least some transducers in a first set of said transducers to transducers in a second set of transducers.

According to another aspect of the present invention there is provided signal receiving apparatus comprising:

a signal processing device configured to receive signals from at least some transducers in a set of transducers and to process the received signals in order to select a best said signal that is used to produce an output from the signal receiving device.

According to another aspect of the present invention there is provided a transceiver unit configured to operate with signal transmitting apparatus, signal receiving apparatus and/or a communications system substantially as described herein. According to yet another aspect there is provided a set of transceiver units substantially as described herein.

According to yet another aspect of the present invention there is provided a method of transmitting and/or receiving data in a communication system substantially as described herein.

According to another aspect of the present invention there is provided computer readable medium storing a computer program to operate a method substantially as described herein.

BRIEF DESCRIPTION OF THE FIGURES

For a better understanding of the invention, and to show how embodiments of the same may be carried into effect, reference will now be made, by way of exam+ple, to the accompanying diagrammatic drawings in which.

DETAILED DESCRIPTION OF THE FIGURES

Figure 1:
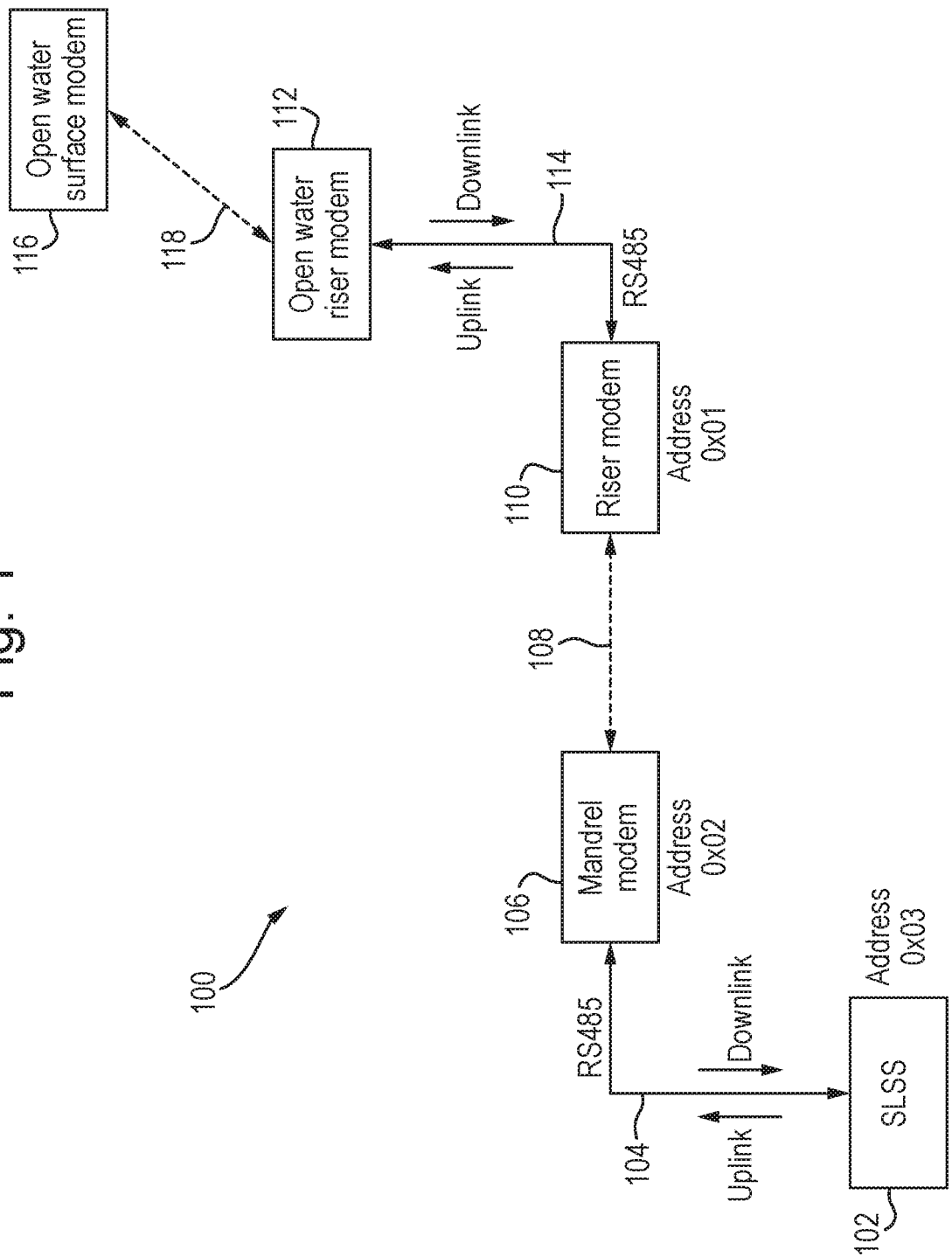
FIG. 1 is a schematic overview of an example communication system including first and second data processing devices that are in communication via an acoustic link provided by various sets of transducers.

Referring to FIG. 1, a schematic overview of an example communication system 100 is shown. The example system comprises a Subsea Landing String System (SLSS) 102 that communicates via an RS485 link 104 with a modem 106 located on a mandrel. An acoustic link 108 provided by transducers (not shown in FIG. 1) allows communication between that modem and another modem 110 located on a riser. The riser modem is in communication with an open water riser modem 112 via an RS485 link 114. That open water riser modem is in communication with a further open water surface modem 116 via an open water link 118.

It will be appreciated that the illustrated communication system's application, links and components are exemplary only. In general, the communications system may include any configuration of data processing components that include/use transducers, typically (but not limited to) ones that can communicate via acoustic links through fluid. Generally, the system will need to provide communication between a first data processing device that is associated with at least one transducer, and a second data processing device that is associated with its own transducer(s). Each transducer may be connected to a member that may or may not be moveable relative to one another. The communication may be unidirectional or bidirectional.

Figure 2:
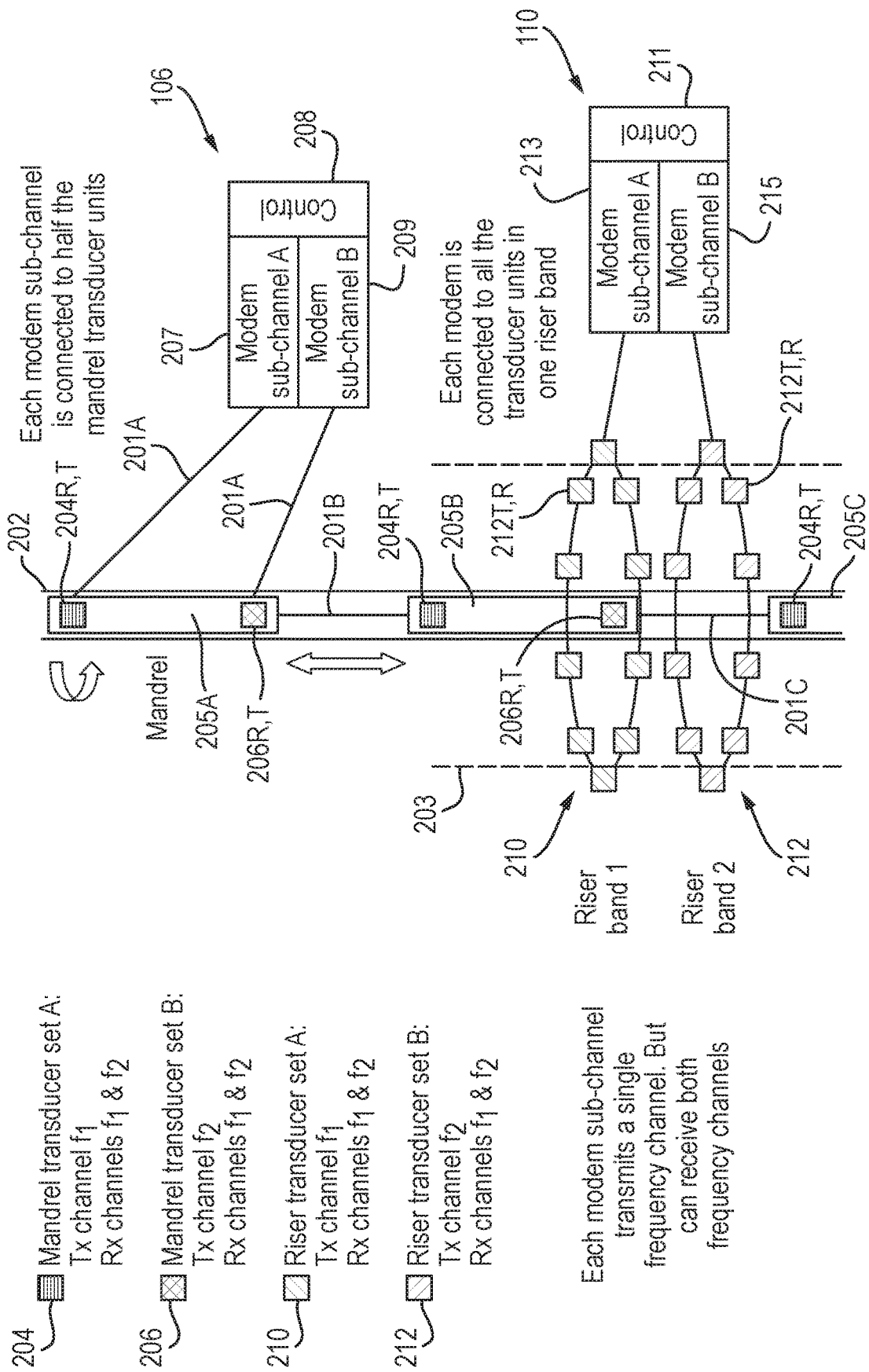
FIG. 2 details parts of the system including the first and second data processing devices and the transducer sets.

FIG. 2 shows the mandrel modem 106, the riser modem 110 and associated components in more detail.

The mandrel modem 106 is in communication with a first set of transducers (not detailed in FIG. 1) that are connected to the mandrel 202. The mandrel modem may be connected to the mandrel itself or to another body. The transducers in this first set are contained in a plurality of transceiver units 205A, 205B, 205C mounted along a 10 m straight length of the external surface of the mandrel. It will be understood that the precise number and arrangement of the transceiver units can vary, but typically there will be regular spacing between adjacent pairs of transducers/transceiver units. The connection of the transducers to the mandrel may be achieved by any suitable means, e.g. waterproof adhesive, fixings, etc, or the mandrel (or part thereof) may be manufactured with the transducers as integral parts.

In the example embodiment the first set of mandrel transducers is divided into first 204 and second 206 subsets. The mandrel modem 106 provides a first sub channel 207 so that the first subset 204 of transmit transducers are configured to transmit on a first frequency $f_1$. The mandrel modem also provides a second sub channel 209 so that the second subset 206 of transmit transducers are configured to transmit on a second, different frequency $f_2$. The receive transducers of the first subset and the second subset can receive on both frequencies $f_1$ and $f_2$.

Each transceiver unit 205 comprises a housing, typically in the form of a rectangular box having front, back, first end, opposite end, first side and opposite side surfaces, although it will be appreciated that the dimensions and design can be varied. There is a pair of transducers at/adjacent each (opposing) end of the transceiver unit: one transducer in the pair functioning as a transmitter and the other transducer in the pair functioning as a receiver. The pair of transducers at one end will normally be in the first subset and the pair of transducers at the other end in the second subset. For example, the transceiver unit 205A comprises a transducer pair 204T, 204R (of the first subset) at one end, and a transducer pair 206T, 206R (of the second subset) at its other end. Thus, in the example system, the first 204 and second 206 subsets of the mandrel transducers are arranged in a line as two interleaved groups along the mandrel. Each transducer may be manufactured from a single piezoelectric element, although in other embodiments, different types of transducers may be used. Each transducer may have an associated amplifier.

The mandrel modem 106 is connected to a first of the transceiver unit 205A by means of a first cable 201A. For ease of illustration, the cable 201A is illustrated by means of two lines in the Figure, but it will be understood in practice that a single cable may extend between the modem and the transceiver unit, which may be split and connected to each transducer 204T, 204R, 206T, 206R within the unit.

The first transceiver unit 205A is connected to the second transceiver unit 205B by means of a second cable 201B. That second transceiver unit is connected to a third transceiver unit 205C by means of a third cable 201C. Thus, the mandrel modem 106 is connected to a "daisy-chain" of transceiver units by means of respective cables. It will be understood that the number and arrangement of transceivers/cables is exemplary only and in other embodiments different numbers and/or arrangements of transceivers/cables could be used. Further, all the transceivers/cables need not be of exactly the same type/design. In other applications, the communication may be via wired medium. In alternative embodiments at least part of the functionality of the modems described herein may be implemented by components integral with a transducer transceiver (or transmitter/receiver) unit.

The mandrel modem 106 can include a controller 208 including components as described below, and may receive at least one input from at least one external device, e.g. a temperature sensor. Such an input can form the basis of a signal to be transmitted by the modem. Output produced as a result of signal processing by the mandrel modem may be processed internally, or stored and/or transferred as finalised data for further processing by another device. In some cases, the output produced by a component of the system may be used to control a device, such as a motor.

Although the detailed example described herein uses two subsets of transducers, with each subset being configured to transmit on a different frequency, it will be understood that variations are possible in other embodiments. For example, more than two subsets of transducers could be provided, with the processing of the system being modified to select a best link from between the three subsets. Alternatively or additionally, the transducers in a particular subset could share a distinguishing characteristic other than a common transmission frequency that can be used as part of a link selection process.

The riser modem 110 is connected to a second set of transducers that are connected to the riser 203. Again, the communication and connection means can comprise any suitable technology. In the example embodiment this second set of riser transducers is divided into first 210 and second 212 subsets. The first 210 and second 212 subsets of riser transducers are arranged in the form of first and second, respectively, closely spaced bands/loops/rings on the external surface of the riser 203. Although not fully illustrated for reasons of clarity, a transceiver unit mounted on the riser will comprise one pair of transducers in the subset 210 and a corresponding (in terms of radial position) pair of transducers in the subset 212. For example, the transducer pair labelled 210T, 210R and the transducer pair labelled 212T, 212R can be located at opposing ends of one riser transceiver unit. Other riser transceiver units are not labelled in this way in the Figure.

The riser modem 110 provides a first sub channel 213 so that the first subset 210 of riser transmit transducers are configured to transmit on a first frequency $f_1$ (which, in the example embodiment, is the same as the frequency $f_1$ used by the first subset 204 of the mandrel transducers). The riser modem also provides a second sub channel 215 so that the second subset 212 of riser transmit transducers are configured to transmit on the second frequency $f_2$ (which, again, in the example embodiment, is the same as the frequency $f_2$ used by the second subset 206 of the mandrel transducers). The receive transducers of the first subset and the second subset can receive on both frequencies $f_1$ and $f_2$.

The use of the two modem sub-channels on both the mandrel 202 and riser 203 allows greater separation of interfering transducers. The riser modem 110 can include a controller 211 including components as described below, and may receive at least one input from at least one external device. Output produced by the riser modem may be processed internally, or stored and/or transferred for further processing by another device, e.g. a remote device that is in communication with the open water surface modem 116.

It will be understood that the illustrated arrangement of 5 transducers is exemplary only and alternatives are possible, e.g. in some cases a different arrangement, e.g. open loop or grid, may be used. Similarly, in the case where more than two different frequencies are used in the system, a corresponding number of subsets/groups can be provided.

As illustrated by the arrows in FIG. 2, during docking, as the mandrel 202 is lowered into the riser 203, several transducers 204, 206 on the mandrel address several transducers 210, 212 on the riser, whilst rotation of the mandrel about its axis is uncontrolled. Fluid will usually surround/flow between the mandrel and the riser. Individual transceiver units provide communications coverage for approximately +/−20° rotation and +/−80 mm linear relative motion. A ring of up to 10 units in each riser band/subset 210, 212 can provide 360° coverage and 30 mandrel transceivers in each of the interleaved arrays 204, 206 on the mandrel can provide a large linear operational range (up to 10 m). This can allow the example system to start communicating around 10 m above final fixed/docked position and does not require angular alignment.

The two sub-channels 207, 209; 213, 215 in both the mandrel 106 and the riser 110 modems can be combined into a single hardware unit. As will be described below in more detail, a logical connection between the two sub-channels can be used on the receive side to select the data with the best performance.

The use of two interleaved mandrel transducer groups can accommodate the use of Frequency Division Multiple Access (FDMA) with two frequency channels, one for each group. This allows greater separation of interfering transducers to overcome the problem of modems receiving signals with both positive and negative Doppler during the mandrel docking procedure and to reduce the effect of nulls introduced by the severe multi-path environment. The two channels can be centred on a chosen Intermediate Frequency (IF), based on the characteristics of the transducers and/or operating environment, e.g. fluid type/density. The same data is transmitted on both frequencies, but the link is made by different transducers. In both communications directions, individual transducers transmit on a single frequency channel ($f_1$ or $f_2$) and receive on both channels ($f_1$ and $f_2$). It will be understood that in alternative embodiments, e.g. ones that do not use a request/response protocol, the data transfer could be unidirectional, e.g. from the mandrel to the riser only.

Although multiple frequencies are used in the example embodiment, the overall communications channel will be half-duplex and therefore there will still be Time Division Multiplexing (TDM) between the two communication directions. This can remove the problem of using simultaneous transmit and receive frequencies and the problems of the transmitted signals swamping the receiver.

Figure 3:
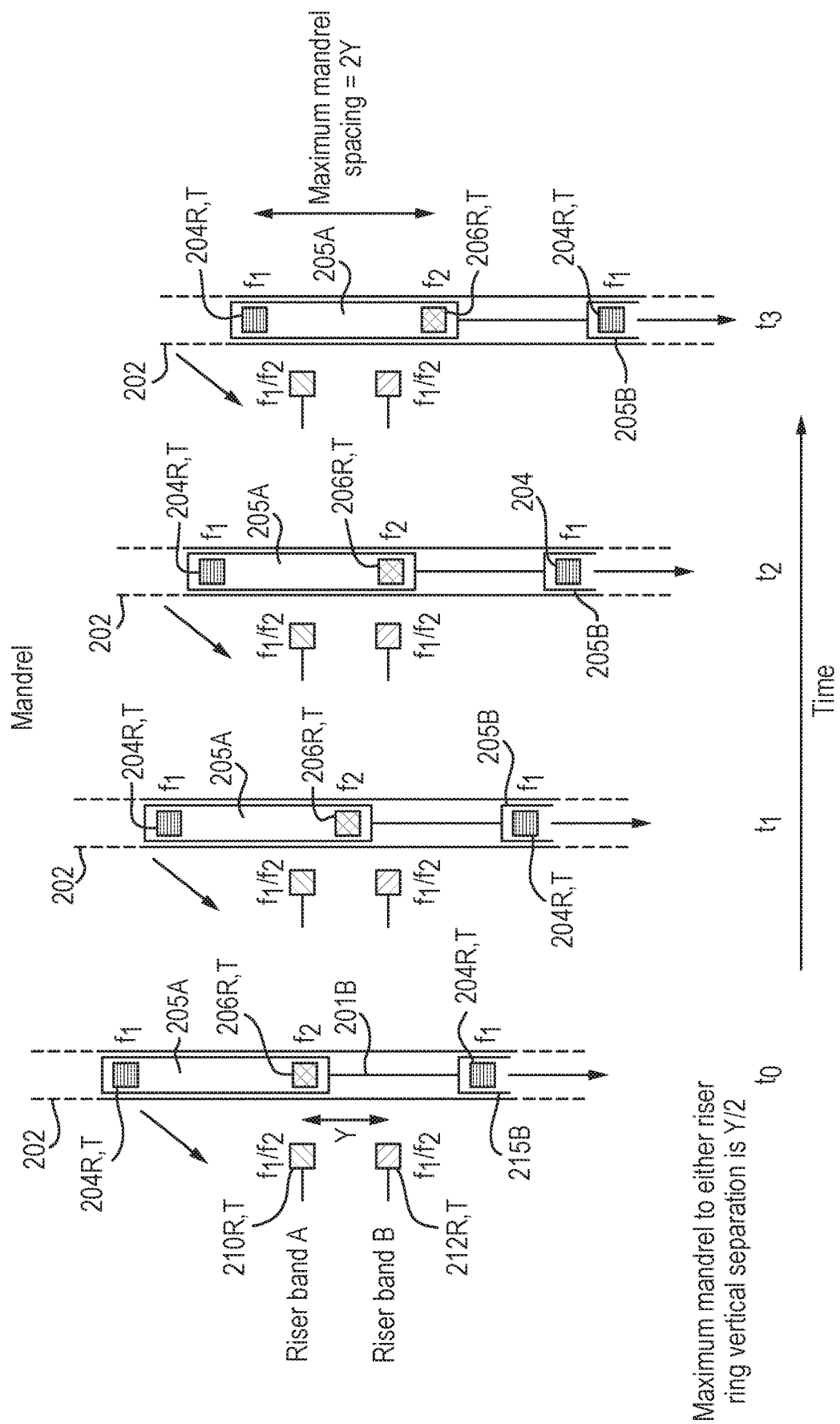
FIG. 3 schematically illustrates data transfer from the first data processing device and its associated transducer sets to the second data processing device and its associated transducer sets.

FIG. 3 schematically illustrates communication in the mandrel 202 to riser 203 direction as the mandrel is lowered. It also illustrates the maximum mandrel transducer 204, 206 spacing of 2Y, given a riser transducer band 210, 212 separation of Y and a maximum mandrel to riser vertical misalignment of Y/2. In preferred embodiments, the vertical spacing between the transducers on the mandrel and those on the riser is equal (i.e. Y).

As discussed above, the mandrel transducers are separated into two interleaved subsets/groups 204, 206 (within transceiver units 205) along a length of the mandrel 202. Each subset transmits on only one of the frequencies $f_1$ or $f_2$. The two riser modem sub-channels 213, 215 receive both frequencies $f_1$ and $f_2$ via the bands/subsets 210, 212 of riser transducers. This can overcome the problem of two transducers at the same range with opposite Doppler, as it is assumed that for the frequency forming the best link, only a maximum of one transducer from that subset makes any significant contribution to the communications channel at any particular time due to spatial separation and the associated propagation attenuation.

Figure 4:
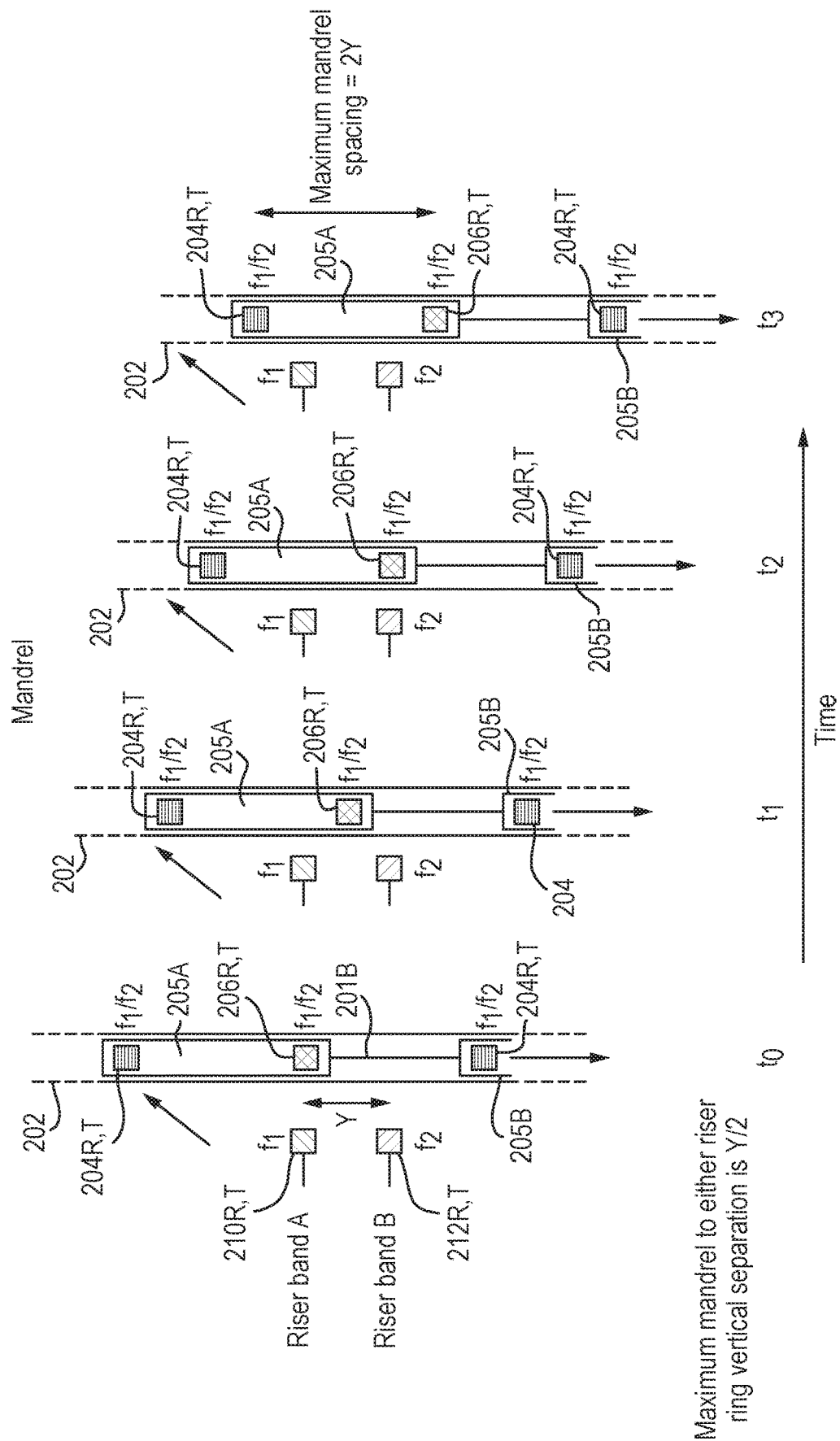
FIG. 4 schematically illustrates data transfer from the second data processing device and associated transducer sets to the first data processing device and associated transducer sets.

FIG. 4 schematically illustrates communication in the riser 203 to mandrel 202 direction. It also shows the maximum mandrel transducer 204, 206 spacing of 2Y, given a riser transducer band 210, 212 separation of Y and a maximum mandrel to riser vertical misalignment of Y/2. In preferred embodiments, the vertical spacing between the transducers on the mandrel and those on the riser is equal (i.e. Y).

As discussed above, the riser transducers transmit on different frequency channels $f_1$ or $f_2$ from each riser band/subset 210, 212, respectively. The mandrel modem 106 receives on both frequency channels $f_1$ and $f_2$ via the mandrel transducers in the respective subsets 204, 206.

Demodulating two channels is achieved by splitting the channels in the digital processing performed by the modems 106, 110. Although this requires extra digital processing power (approaching double that of a single channel), it has a number of significant advantages in terms of system and communications performance, including:

It is required for the riser to mandrel direction to overcome the Doppler problem It allows the greatest spatial separation of interfering transmissions from other transducers using the same channel Transmitting on a single frequency channel gives the best performance, as all the signal power to be dedicated to a signal channel Modems for the mandrel and riser have common functionality.

Figure 5:
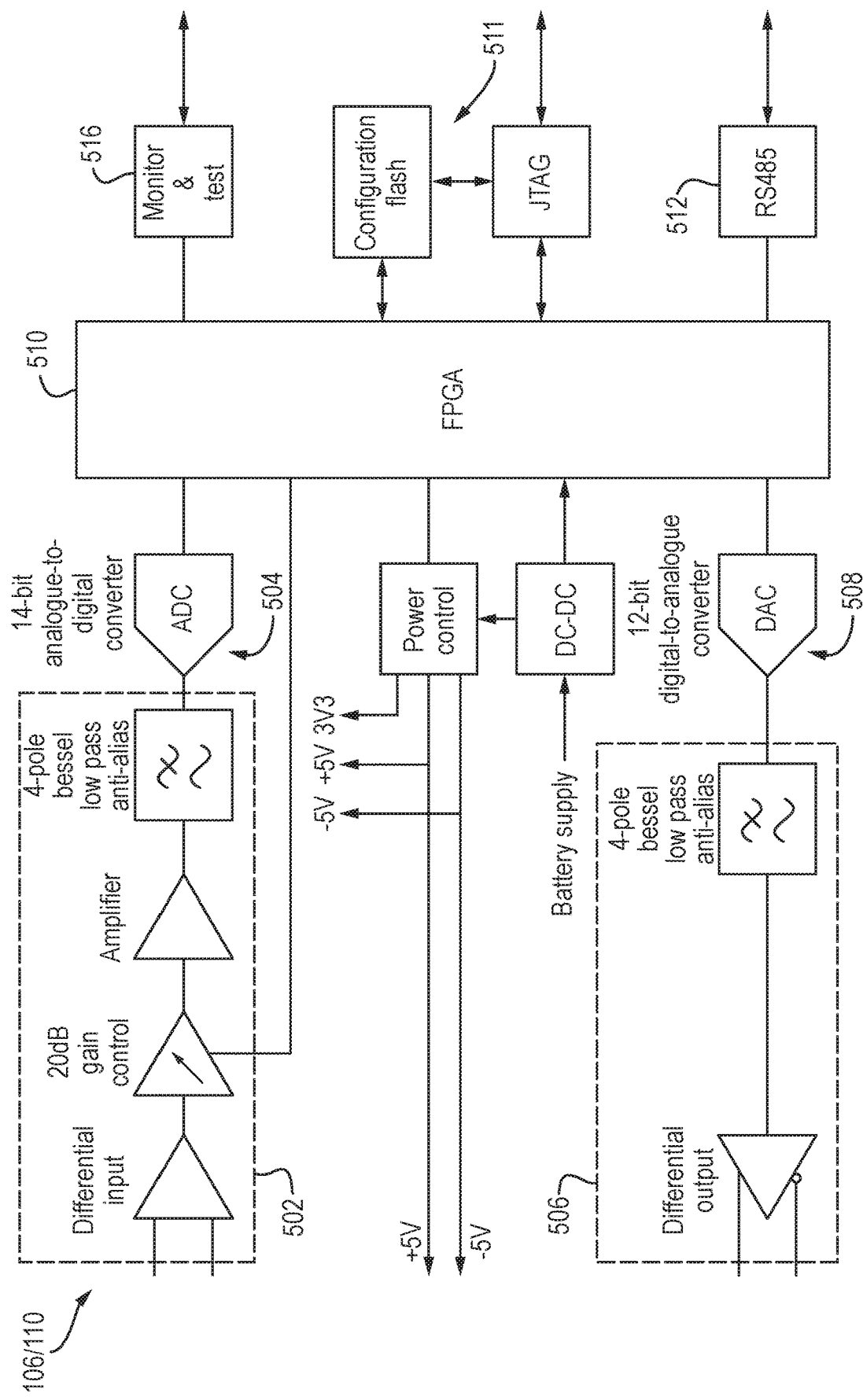
FIG. 5 is a block diagram of one of the data processing devices.

FIG. 5 shown an example of the electronic components used for the mandrel 106 or riser 110 modem. The example modem comprises: an analogue front end 502; analogue to digital converter 504; analogue back end 506; digital to analogue converter 508; FPGA 510 and supporting configuration components 511; RS485 interface 512; DC-DC converters and power control 514, and monitoring and test interfaces 516. The analogue front end 502 and back end 506, as well as the ADC converter 504 and the DAC converter 508, are each duplicated, one for each of the two transceivers subsets 204, 206; 210, 212 on the mandrel 202 and the riser 203.

The example modem design is based on a Coded Orthogonal Frequency Division Multiplex (COFDM) approach. COFDM provides a rugged solution to transmitting digital data at high rates through an environment where multipath signals with different times of arrival produce significant signal interference.

Returning to FIG. 1, in the example system the RS485 is a half-duplex communications link using the known MODBUS serial transmission Remote Terminal Unit (RTU) protocol, operating in unicast mode with matching requests and replies. The RS485 link is set for 19200 baud, even parity, 1 start and 1 stop bit. In a typical example operation, the open water surface modem 116 can request data from the SLSS 102 (e.g. a temperature, fluid flow rate or other characteristic measurement taken by a sensor that is on board (or is in communication with) the SLSS), with the request being transferred via the illustrated components and links in sequence using the MODBUS protocol. Response data is transferred back in a reverse manner using the MODBUS protocol. This conventional/normal manner of operation is referred to herein as the "transparent mode".

The system 100 is configured to operate in two distinct modes: the transparent mode for sending command and status requests as discussed above, and a "data streaming mode" to retrieve high rate data from SLSS 102. Due to the relatively high latency of the acoustic link 108 compared to the other data links in the system, the process of rippling requests through the various links of the system introduces considerable delays. Although this may be acceptable for the transparent mode, it can significantly degrade the throughput rate for data streaming and so the specialised data streaming mode is used.

It will be appreciated that the illustrated communication system's application, links and components are exemplary only. In general, the principles described herein can be applied to any communication system that includes at least one data link having a relatively higher latency than other links in the system, e.g. an acoustic link in a system where the other links are higher-speed wired or wireless communications. However, the higher latency link(s) may comprise an acoustic link, or any other type of link, e.g. in outer space applications long latency may be due to great distances between communication components. Embodiments of the system may also use request-response protocols other than MODBUS.

In the illustrated example system the data streaming mode can operate by "breaking" the single MODBUS link into two. However, it will be understood that in other embodiments, more than one "break" in a system can be made in order to address multiple higher-latency links. In the example embodiment, in the data streaming mode, data can be continuously read from two components that are configured to operate as local slaves, the riser modem 110 and the SLSS 102. The open water riser modem 112 and the mandrel modem 106, respectively, act as the masters for these components. Data from the SLSS is passed to the riser modem (over the acoustic link 108), where it can be read by the open water riser modem. The acoustic link does not implement the MODBUS protocol in the data streaming mode.

Figure 6:
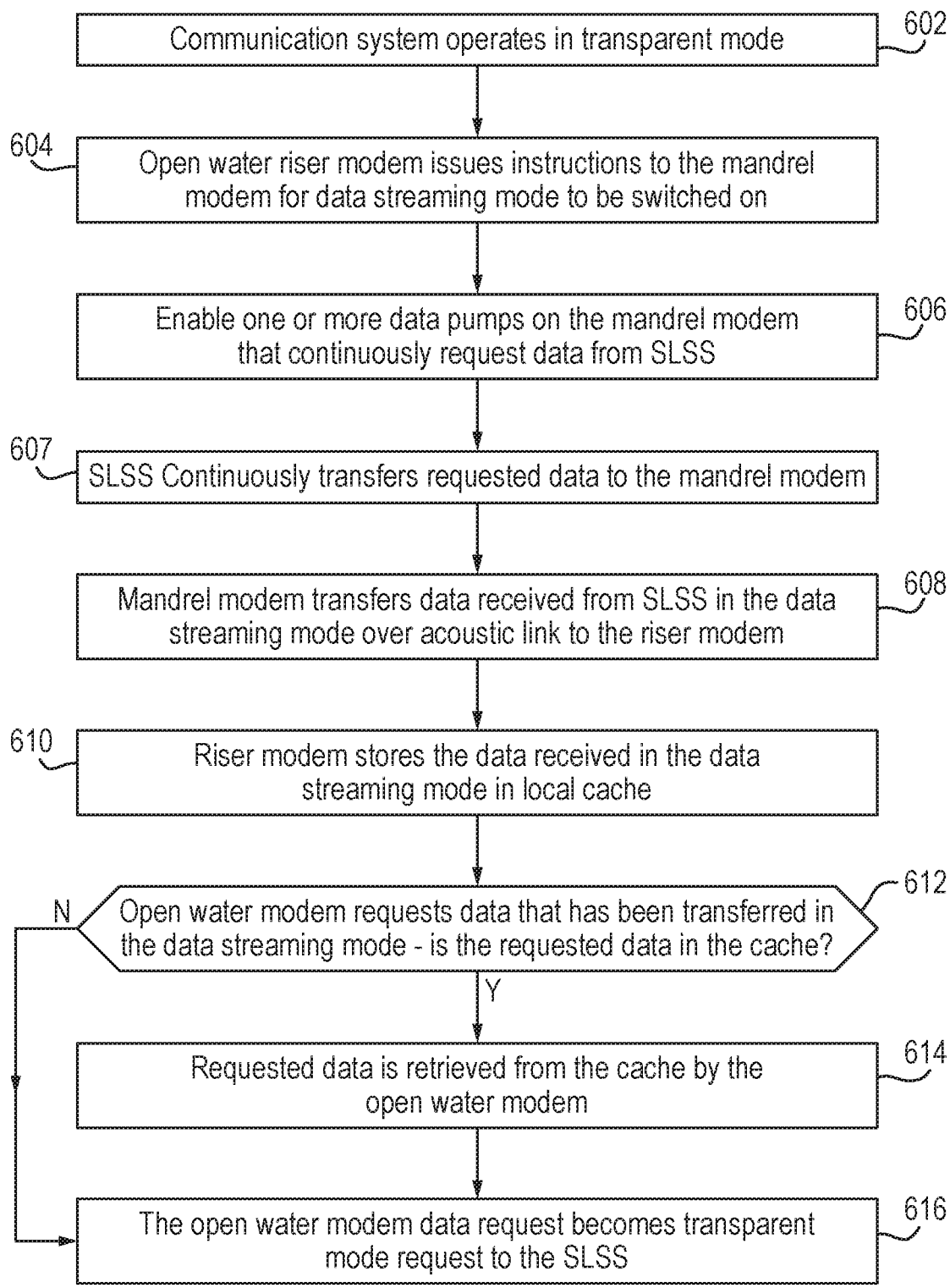
FIG. 6 is a flowchart illustrating example operations performed by the communication system.

FIG. 6 schematically illustrates steps that can be typically performed during operation of embodiments of the communication system 100. It will be appreciated that the steps of FIG. 6 are exemplary only and in alternative embodiments at least some of the steps may be re-ordered or omitted, and/or additional steps may be performed. It will also be understood that the system can be implemented using any suitable hardware, software, programming languages and data structures.

At step 602, the communication system 100 operates in its normal transparent mode, with data requests and responses being made in accordance with the MODBUS protocol. Thus, the open water riser modem 112 makes one request at a time for data. The request can specify the MODBUS address of the component where the requested data is stored and/or the particular data to be transferred, e.g. the contents of a specified set of registers of the SLSS 102. The open water riser modem then waits for the response.

The data transferred may be packaged, e.g. as frames, and in embodiments of the system a frame can include a field that indicates whether its data is for transfer in the transparent mode or the data streaming mode. The MODBUS protocol places restrictions on the amount of data that can be requested in one request; however, data streaming mode allows fast transfer of greater amounts of data.

At step 604, the open water riser modem 112, under user control, issues an instruction to the mandrel modem 106 for the data streaming mode to be switched on. The data streaming mode on instruction can specify the data that is to be transferred in any suitable format, e.g. in some embodiments the component storing the required data will always be the SLSS 102, whilst in other cases an address of another data source component may be specified. The particular data to be retrieved, e.g. the contents of a specified block of registers of the SLSS, may also be specified in the instruction, or there may be a "default" data set that is the subject of the data streaming mode.

At step 606, upon receipt of the instruction, data streaming mode is activated by enabling one or more data pumps (modules/applications) on the mandrel modem 106. The data pump(s) operate by becoming a local master to, and continuously (or very frequently, e.g. as fast as the component is able to process) requesting data from, the SLSS 102.

At step 607, as a result of the SLSS 102 functioning as a slave to the data pump of the mandrel modem 106 in the data streaming mode, it continuously (or very frequently) transfers the requested data to the mandrel modem.

At step 608, the mandrel modem 106 transfers the data received from the SLSS 102 in the data streaming mode over the acoustic link 108 to the riser modem 110. A type field in the frame containing this data may indicate that the frame is a data streaming mode frame.

At step 610, the riser modem 110 stores the data received from the mandrel modem 106 in the data streaming mode in a local cache/data store. The riser modem can check whether the type field of the data frame specifies that the data is data streaming mode data in order for it to be stored in this way.

At step 612, the open water modem 112 requests data that has been transferred in the data streaming mode. In the example embodiment, the address of the SLSS 102 is still used to retrieve the responses from the data proxy cache, but these requests are intercepted by the data proxy in the data streaming mode and do not get passed to the SLSS. Thus, if the requested data is available in the data proxy cache then at step 614 the data is retrieved by the open water modem.

However, if the data is not available in the data proxy cache to respond to the open water modem request to the SLSS, then at step 616 the request becomes a normal transparent mode request directly to the SLSS. When reading a block of SLSS registers, all must be present in the cache if a normal transparent mode request is to be avoided.

The open water riser modem 112 can, under user control, issue an instruction to switch off the data streaming mode at any time. In some embodiments, requests in transparent mode can still be processed by the system whilst the data streaming mode is switched on.

It will be apparent to the skilled person that the examples described herein can be combined or adapted in various ways to satisfy the needs of any particular application.

At least some embodiments of the invention may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks. Alternatively, elements of the invention may be configured to reside on an addressable storage medium and be configured to execute on one or more processors. Thus, functional elements of the invention may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Further, although the example embodiments have been described with reference to the components, modules and units discussed below, such functional elements may be combined into fewer elements or separated into additional elements.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A communication system comprising:
   a data requesting component;
   a first data transfer component;
   a first data link between the data requesting component and the first data transfer component;
   a second data transfer component;
   a second data link between the first data transfer component and the second data transfer component, the second data link including an acoustic link;
   a data source component; and
   a third data link between the data source component and the second data transfer component;
   wherein the second data link has a higher latency than at least one of the first data link and the third data link, and wherein the communication system is configurable to operate in
      a transparent mode, in which data is transferred to the data requesting component from the data source component via the third data link, the second data transfer component, the second data link, the first data transfer component, and the first data link using a request-response protocol, and
      a data streaming mode, in which the second data transfer component is configured to operate as a data pump to continuously obtain data from the data source component via the third data link and to continuously transfer the data to the first data transfer component via the second data link without using the request-response protocol, and the first data transfer component is configured to store the transferred data and to transfer the stored data to the data requesting component via the first data link upon receiving a request for the stored data from the data requesting component.

2. The system according to claim 1, wherein the first data transfer component is configured to:
   intercept a request from the data requesting component for data from the data source component, and
   if the data requested by the data requesting component is stored by the first data transfer component then the stored data is transferred to the data requesting component via the first data link, or
   if the data requested by the data requesting component is not stored by the first data transfer component then the system processes the request in the transparent mode.

3. The system according to claim 2, wherein the request is intercepted by recognising an address of the data source component in the request.

4. The system according to claim 1, wherein the data requesting component is configured to operate as a master and the first data transfer component is configured to operate as a slave to the data requesting component in the data steaming mode.

5. The system according to claim 4, wherein the second data transfer component is configured to operate as a master and the data source component is configured to operate as a slave to the second data transfer component in the data steaming mode.

6. The system according to claim 1, wherein data transferred includes an indicator designating whether the data is for transfer using the transparent mode or the data streaming mode.

7. The system according to claim 1, wherein the request-response protocol includes a MODBUS remote terminal unit (RTU) serial communications protocol.

8. The system according to claim 1, wherein the first data link and/or the third data link includes an RS485 link.

9. The system according to claim 1, wherein the first and/or the second data transfer component includes a first set of transducers and a second set of transducers for implementing the acoustic link.

10. A method of operating a communication system of claim 1, the method comprising:
    causing the communication system to operate in either the transparent mode or the data streaming mode.

11. A communication system data transfer component comprising:
    a first communication interface including a first data link having a higher latency than a second data link in the communication system;
    a second communication interface including the second data link in the communication system; and
    a processor configured to operate in
       a transparent mode, in which data is transferred via the first and the second communication interfaces using a request-response protocol, and
       a data streaming mode, in which the data transfer component is configured to operate as a data pump to continuously obtain data from a first communication system component via the second communication interface without using the request-response protocol, and to continuously transfer the obtained data to a second communication system component via the first communication interface without using the request-response protocol, wherein the second data link includes an electronic serial communication link, and wherein the first data link includes an acoustic link.

12. The system according to claim 11, wherein the request-response protocol comprises a MODBUS remote terminal unit (RTU) serial communications protocol.

13. A communication system data transfer component comprising:

a first communication interface including a first data link having a higher latency than a second data link in the communication system, the first data link including an acoustic link;

a second communication interface including the second data link in the communication system; and a processor configured to operate in a transparent mode, in which data is transferred via the first and the second communication interfaces using a request-response protocol, and a data streaming mode, in which the data transfer component is configured to operate as a data pump to continuously obtain data received via the first communication interface without using the response-request protocol, and to continuously transfer the stored data via the second communication interface to a data requesting component without using the response-request protocol.

14. The system according to claim 13, wherein the request-response protocol comprises a MODBUS remote terminal unit (RTU) serial communications protocol.

15. The system according to claim 13, wherein the first data link includes an electronic serial communication link.

* * * * *